No. 871,980. PATENTED NOV. 26, 1907.
G. E. BENTON.
SHEARS.
APPLICATION FILED JUNE 10, 1907.

WITNESSES: George E. Benton, INVENTOR.
By ATTORNEYS.

UNITED STATES PATENT OFFICE.

GEORGE E. BENTON, OF EAST HAMPTON, NEW YORK.

SHEARS.

No. 871,980.

Specification of Letters Patent.

Patented Nov. 26, 1907.

Application filed June 10, 1907. Serial No. 378,199.

*To all whom it may concern:*

Be it known that I, GEORGE E. BENTON, a citizen of the United States, residing at East Hampton, in the county of Suffolk and State of New York, have invented a new and useful Shears, of which the following is a specification.

This invention relates to shears and its object is to provide blades one of which is of novel form and permits a better cut than that obtained by the use of the ordinary straight-edge blades.

A still further object is to provide blades which will not become clogged when the shears are used for cutting growths of a gummy nature.

A still further object is to provide a blade having a plurality of cutting edges designed to successively coöperate with a second blade having a single edge, the edges of the two blades being designed to coöperate to produce a double shearing action.

With these and other objects in view the invention consists of certain novel features of construction and combinations of parts which will be hereinafter more fully described and pointed out in the claims.

In the accompanying drawings is shown the preferred form of the invention.

Figure 1:
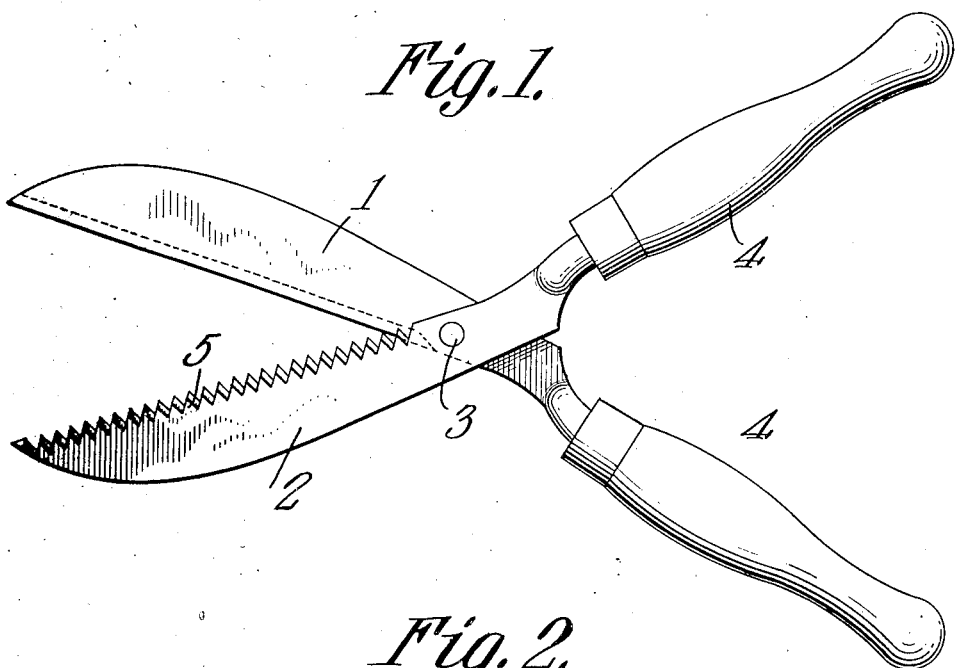
Figure 2:
Figure 3:
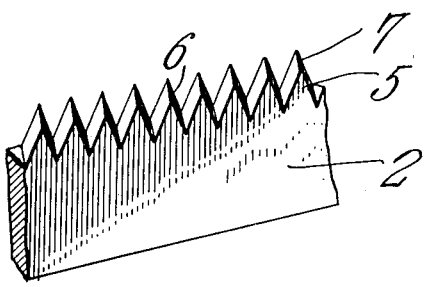

In said drawings: Figure 1 is a detail view of a pair of hedge shears embodying the present improvements. Fig. 2 is an enlarged edge view of a portion of one of the blades of the shears. Fig. 3 is a perspective view of a portion of said blade.

Referring to the figures by characters of reference, 1 and 2 designate the blades of the shears the same being pivotally connected at 3 and provided with suitable handles 4 whereby the device may be conveniently manipulated. Blade 1 is formed with a straight cutting edge extending from the pivot thereof to the outer end or point of the blade. The blade 2, however, is provided with a plurality of teeth 5 corresponding in elevation with the ordinary teeth of a cross-cut saw. Those faces of the teeth nearest the pivot 3 are inclined backward from the outer face of the blade toward the blade 1 and the pivot 3 so that a plurality of parallel cutting edges 6 are produced all of said edges being disposed along lines intersecting the cutting edge of blade 1. The upper edges 7 of the teeth are inclined as indicated so as to produce points disposed in the same plane as the inner face of the blade 2. It is therefore apparent that each tooth 5 will contact with the blade 1, beginning at the point of the tooth and moving over the blade throughout the length of the edge 6. A shearing action is therefore produced not only by the blade 1 but also by each successive tooth 5. It is therefore apparent that each tooth in itself constitutes a separate cutting blade.

The advantages of the construction described will it is thought be obvious in view of the foregoing description. Where the shears are used for cutting hedge the teeth 5 will engage the material to be cut and prevent it from slipping along the blade 2. The handles when drawn together will cause the blade 1 to cut successively into the material held by the respective teeth and while the blade 1 is cutting into the material the adjoining tooth 5 is also cutting thereinto and a double shearing action is therefore produced. The operation of cutting is therefore greatly facilitated. The teeth not only increase the shearing action of the device but also prevent the material from slipping along the blade while being cut.

While the invention has been shown and described in connection with hedge shears it is to be understood that the same may be embodied in scissors or shears of any variety among which may be mentioned pruning, edging, and grass shears, shears for cutting leather, paper, linoleum, oil-cloth, and snips such as utilized for cutting sheet metal.

What is claimed is:

A cutting implement of the character described comprising a blade having a continuous cutting edge, and a second blade pivotally connected thereto and having a plurality of teeth, each of which is in the form of an isosceles triangle, those faces of the teeth nearest the pivot being inclined backward from the outer face of the blade and toward the first mentioned blade and the pivot to constitute deflectors, said faces terminating in a plurality of parallel cutting edges all of said edges being disposed along lines intersecting the edge of the first mentioned blade, the upper edges of the teeth being inclined and terminating in points disposed in the same plane as the inner face of the toothed blade.

In testimony that I claim the foregoing as my own, I have hereto affixed my signature in the presence of two witnesses.

GEORGE E. BENTON.

Witnesses:
 EDWARD C. DEMPSEY,
 GEO. MACMONOGLE.